Jan. 7, 1969  E. ZILLMER  3,420,607
STRUCTURE FOR SUPPORTING COMPONENTS OF A PHOTOGRAPHIC PROJECTOR
Filed Jan. 25, 1966
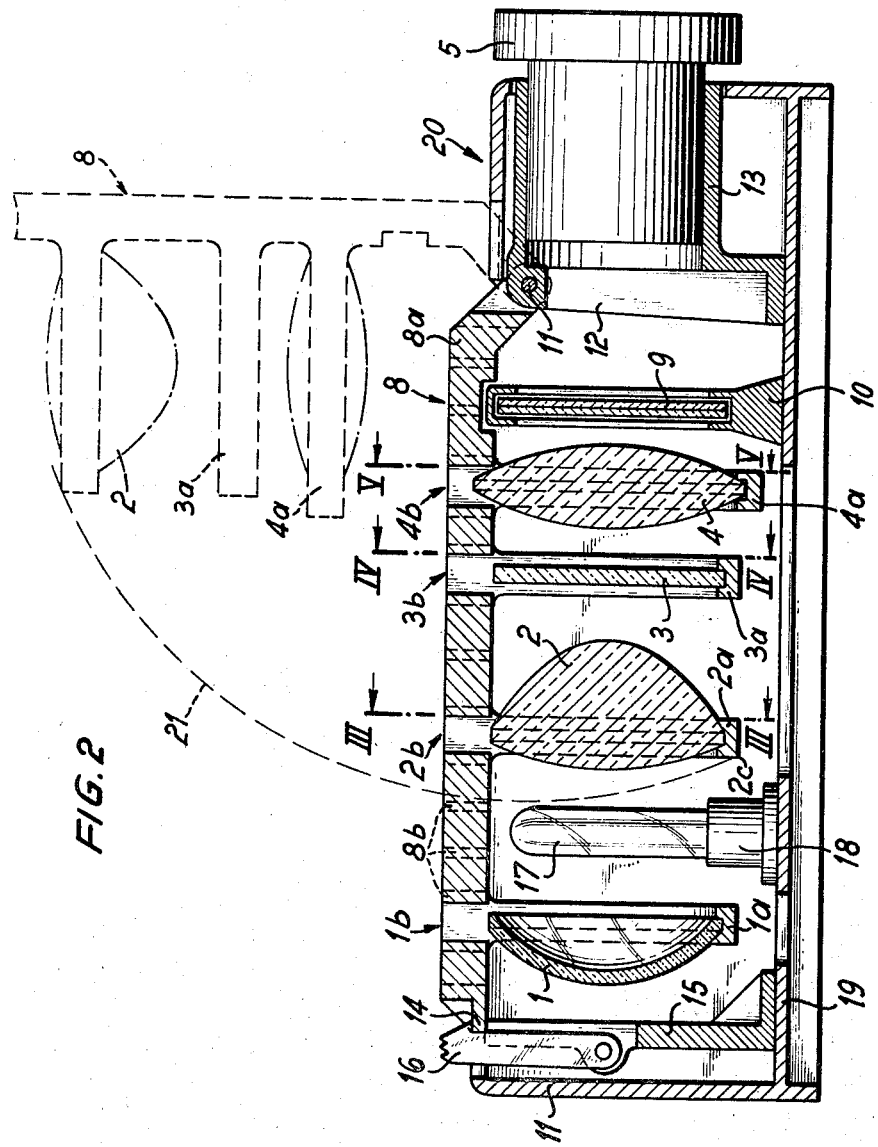

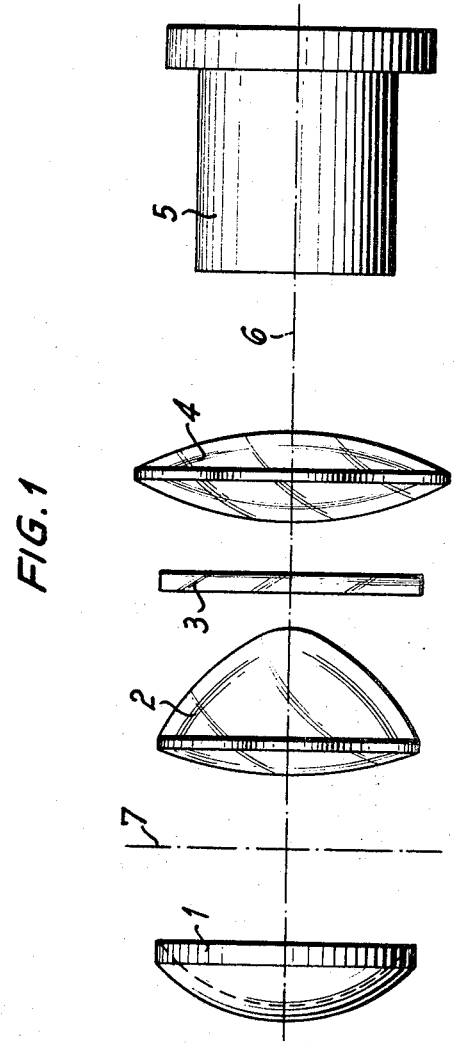

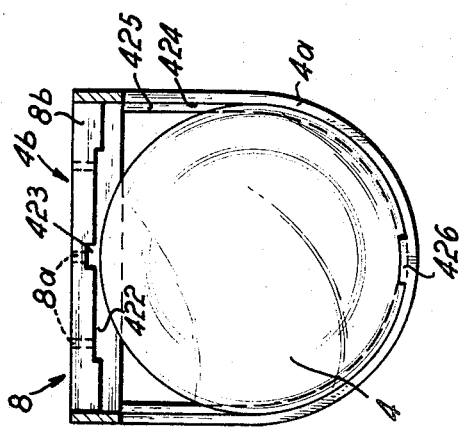
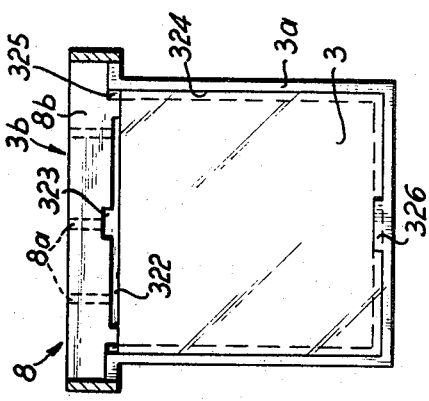
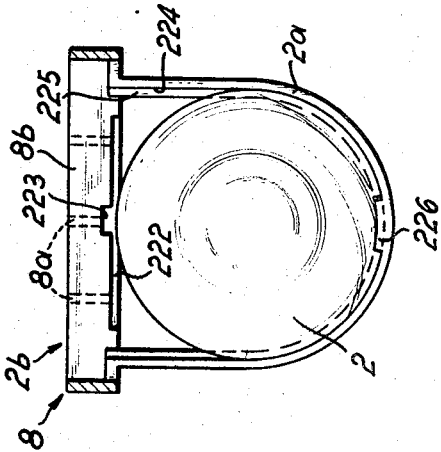

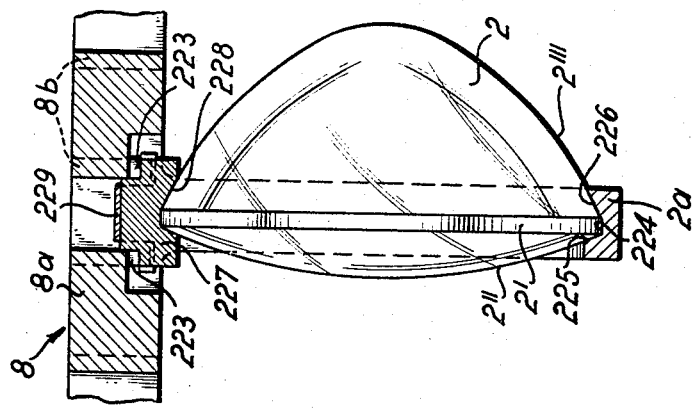
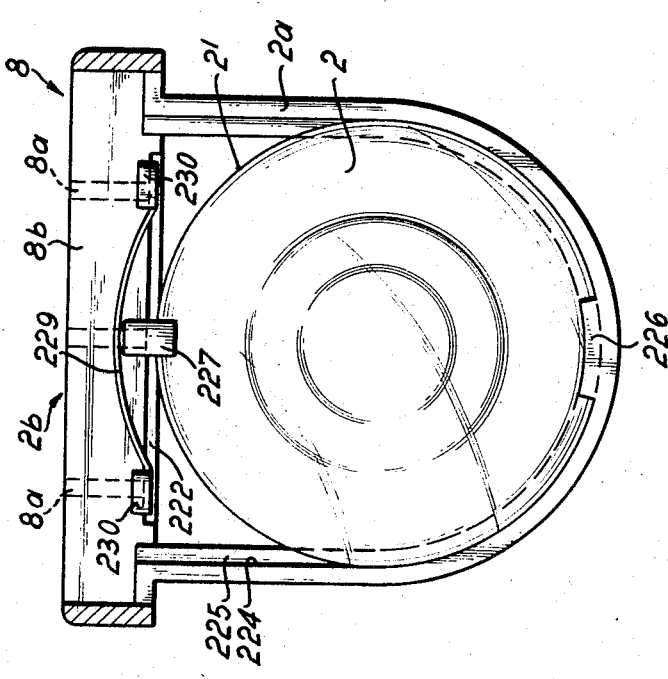

United States Patent Office 3,420,607
Patented Jan. 7, 1969

3,420,607
STRUCTURE FOR SUPPORTING COMPONENTS OF A PHOTOGRAPHIC PROJECTOR
Erich Zillmer, Braunschweig, Germany, assignor to Voigtlander A.G., Braunschweig, Germany, a corporation of Germany
Filed Jan. 25, 1966, Ser. No. 522,919
Claims priority, application Germany, Feb. 4, 1965, Z 11,306
U.S. Cl. 353—100    3 Claims
Int. Cl. G03b 21/14

ABSTRACT OF THE DISCLOSURE

An apertured lamp-housing cover having molded integral therewith a plurality of holders for optical elements of a slide projector. A plurality of springy elements situated in the openings of the cover in registry with the holders yieldably maintain the optical elements therein. The cover is hinged at one end to the projector so that upon upward rotation of the cover to its open position, the optical elements attached thereto are pivoted out of the projector housing. This provides free access to the optical elements of the projector for the purpose of removing dust or, if desired, for interchanging the optical elements.

---

The present invention relates to photographic projectors and especially to structure for supporting components of such projectors.

In particular, the present invention relates to the structure which carries the optical elements which are situated in the lamp housing of a photographic projector.

The lamp housing of a photograpic projector is conventionally covered by a cover which is apertured so that the heat which is generated from the lamp in the interior of the lamp housing can pass out to the exterior through the apertures of the lamp-housing cover. Such covers are conventionally in the form of a grid having upstanding ribs which define between themselves the apertures through which the heat passes from the interior to the exterior of the lamp housing, and such a grid will to a large extent break up the light from the lamp as well as the ambient light.

Covers of this latter type are for the most part manufactured by being molded or cast in a suitable mold under pressure. One of the well established principles of this latter type of manufacture resides in the proposition that it is possible to save more money and to reduce cost to a greater extent by reducing the costs involved in connection with the tools, as compared with mere simplification of the manufactured articles themselves. The present invention is based on recognition of this latter proposition, but at the same time it will also provide not only economic but also practical advantages.

In lamp housing of the above type there are situated, beside the lamp itself, the several optical elements required to project an image. The optical elements are made up of differently constructed, relatively heavy optical components which are required to have a precise predetermined relationship with respect to each other, insofar as their size and location is concerned, as well as with respect to the objective. For the most part it is conventional to use for optical elements of this type holders made of sheet metal and slidably guided in suitable guides of the lamp housing so that these holders can be introduced into and removed from the lamp housing with the optical elements which are carried by the holders. Each holder of this type carries a single optical element. This construction is very expensive particularly because of the fact that the optical elements have different sizes and therefore require for each element a special holder. It is therefore not possible to manufacture these slidable holders with a single set of tools.

It is accordingly a primary object of the present invention to provide a great economic advantage in the structure of projectors of the above type by making it possible to completely eliminate the differently constructed and therefore expensive holders for the optical elements.

It is furthermore an object of the present invention to provide an exceedingly stable support for the optical elements as well as a guarantee of a precise and highly accurate positioning of the optical elements with respect to each other and with respect to the objective of the projector.

Furthermore, it is an object of the present invention to provide a structure which will render not only the optical elements but also the lamp highly accessible so that the operator can whenever desired have free access to all of these components for the purpose of removing dust therefrom, for example.

Furthermore, it is an object of the present invention to provide for the projector a load distribution which is far superior to the conventional load distribution encountered in conventional projectors.

Furthermore, it is an object of the invention to provide a structure which will dissipate heat more efficiently than has heretofore been possible with conventional projectors.

It is furthermore an object of the invention to provide a construction where only a relatively small number of basically different types of structures are required for different types of projectors, even providing the possibility of interchanging these structure when the optical principle of operation of a projector is changed for another optical principle of operation.

The invention resides primarily in fixedly connecting with the apertured lamp-housing cover the holders for the optical elements in such a way that these holders and the cover of the lamp housing form a single structural unit.

The invention is illustrated by way of example in the accompanying drawings which form part of the application and in which:

FIG. 1 schematically illustrates the size relationships between conventional optical elements of a photographic projector, as well as the location of these elements with respect to each other;

FIG. 2 is a longitudinal sectional elevation of that part of a photographic projector which is provided with the structure of the invention, the plane of FIG. 2 being vertical and including the optical axis of the projector;

FIG. 3 is a transverse section of the structure of FIG. 2 taken along line III—III of FIG. 2 in the direction of the arrows;

FIG. 4 is a transverse section of the structure of FIG. 2 taken along line IV—IV of FIG. 2 in the direction of the arrows;

FIG. 5 is a transverse section of the structure of FIG. 2 taken along line V—V of FIG. 2 in the direction of the arrows;

FIG. 6 shows the structure of FIG. 3 at an enlarged scale, as compared to FIG. 3, together with additional elements which serve to releasably hold an optical element in the holder of FIGS. 3 and 6;

FIG. 7 is a fragmentary longitudinal section taken through the structure of FIG. 6 in a vertical plane which includes the optical axis.

Figure 8:
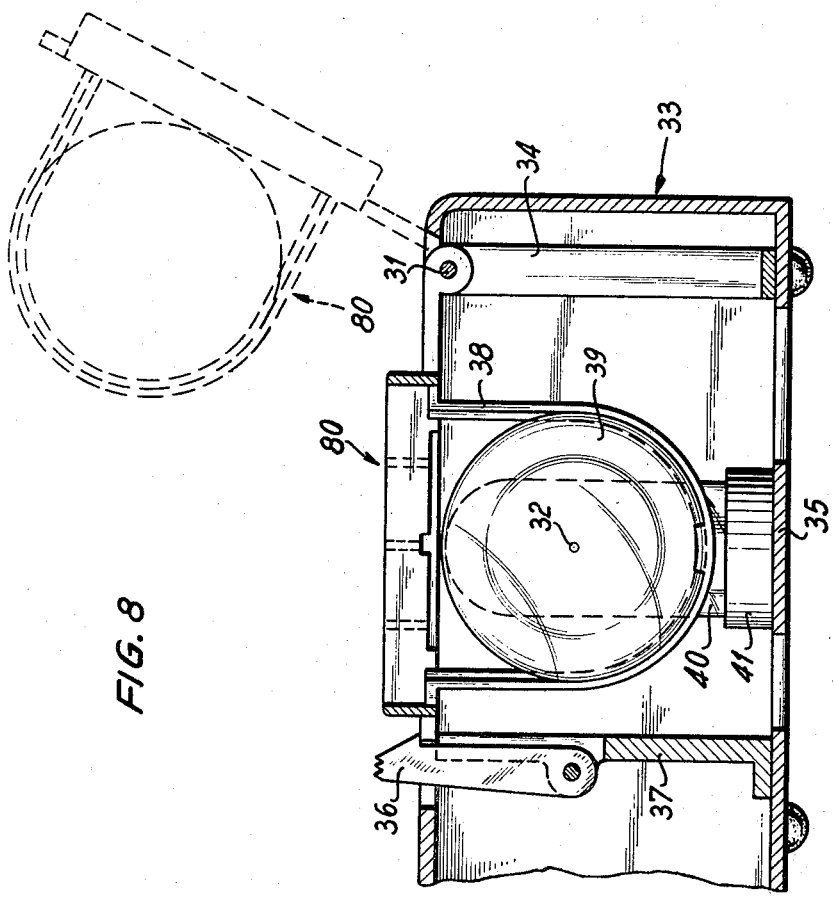
FIG. 8 is a fragmentary transverse section showing another embodiment of the structure of the invention, FIG. 8 illustrating that part of the projector which is provided with the structure of the present invention.

Referring now to FIG. 1, there are shown therein the conventional optical elements of a photographic projector. These elements include the hollow reflector 1, the aspherical lens 2, the heat filter 3, the image-forming lens 4, and the objective 5. The optical axis 6 is indicated by a dot-dash line, and of course there is one optical which is common to all of these elements. The lamp is situated at the location indicated by the dot-dash lines 7. FIG. 1 demonstrates how expensive it is to provide separate holders for the differently constructed optical elements which are of different shapes and sizes, as well as to provide the structures for positioning the elements properly with respect to each other.

FIG. 2 illustrates one possible embodiment of a structure in accordance with the present invention which solves the problems encountered with the high costs of conventional structures. Instead of the conventional holders for the several optical elements, namely one holder for one element, the optical elements are carried by holders which are fixed to the lamp-housing cover 8 in a manner forming a structural unit therewith. More particularly, the lamp holders as well as the cover 8 are all cast or molded in a single mold so as to form one integral, one-piece structure. The hollow reflector 1 is supported by a holder 1a, the aspherical lens 2 by a holder 2a, the heat filter 3 by a holder 3a, and the image-forming lens 4 by a holder 4a. The aperture plate 10 properly locates the slide 9 in the projection plane where it will be positioned accurately with respect to the other elements so that the projector will form a proper image.

In order to provide a precise positioning of the optical elements 1–4 with respect to the objective 5, the cover 8 is supported by a hinge means which includes a pivot pin 11 carried by a support member 12, the cover 8 being turnable on the pivot or hinge pin 11. This support member 12 is in addition provided with a tubular extension 13 which serves to adjustably carry the objective 5. The apertured cover 8 rests at its end 14 which is distant from the hinge pin 11 on a second support 15 which is fixedly carried by the projector housing, and a releasable lock member 16 retains the cover 8 in the closed position shown in FIG. 2. As a result of the structural unification of the holders 1a, 2a, 3a and 4a with the cover 8, and by way of its connection with the support member 12, which at the same time, through its tubular extension 13, forms a support for the objective 5, the proper precise interrelation between all of the differently sized and shaped optical elements is guaranteed. Also, the relationship with respect to the projection lamp 17 is guaranteed by mounting the socket 18 for the lamp 17, as well as the pair of support members 12 and 15 and the aperture plate 10 on a common support means formed by the floor 19 of the projector housing 20.

The cover 8 is shown in FIG. 2 in dotted lines tilted upwardly to its open position. It is apparent that in this latter position all of the optical elements are freely accessible. Moreover, the arc 21 demonstrates that the lower left edge 2c of the holder 2a will not engage the lamp 17 during the turning of the cover 8. The illustrated lamp is a quartz-iodine lamp which has a substantially cylindrical envelope of particularly small diameter.

A molded or cast element is of particular advantage, with respect to cost, when the mold in which it is formed requires a draft or taper to extend in only one direction. Conventional slidable holders which must have a second draft extending in a direction transverse to the primary draft direction greatly complicate the structure of the mold and thus undesirably increase the manufacturing costs.

The lamp-housing cover 8 of the invention is essentially a grid formed from intersecting longitudinal ribs 8a and transverse ribs 8b. The section of FIG. 2 is taken through the middle one of the longitudinal ribs 8a in a vertical plane which includes the optical axis. The holders 1a, 2a, 3a and 4a are, as is particularly apparent from FIG. 2, respectively situated between pairs of successive transverse ribs 8b. Moreover, each pair of successive transverse ribs 8b, where a holder is located does not have any longitudinal ribs extending therebetween, so that the longitudinal ribs of the cover 8 are interrupted at the spaces between the successive transverse ribs between which the holders for the optical elements are situated. Therefore, the cover 8 is formed with a plurality of transverse openings or windows 1b, 2b, 3b and 4b which provide the holders with elongated openings at one side thereof communicating through the cover itself with the outer atmosphere. As a result of the presence of these windows or openings 1b–4b, it is possible to situate the mold cores which determine the configuration of the holds 1a–4a in positions extending thorugh the openings 1b–4b.

FIGS. 3–5 show the details of the holder 2a for the aspherical lens 2, the holder 3a for the heat filter 3, and the holder 4a for the image-forming lens 4. As is apparent from these figures each of these holders is of a substantially U-shaped configuration and has a shape and size which conforms to the shape and size of the optical elements to be carried by the holders, respectively. FIGS. 3–5 illustrate the optical elements resting in the holders but not the structure for releasably fixing the optical elements in the holders. It is, however, apparent from FIGS. 3–5 that one of the transverse ribs 8b adjacent the several holders is provided with a groove 222, 322, 422 at its lower edge and is in addition formed with a notch 223, 323, 423 communicating with and forming an upward extension of the groove. The unillustrated transverse ribs which are situated at the other side of the transverse openings and which face those ribs 8b illustrated in FIGS. 3–5 have the same construction, so that each pair of adjoining transverse ribs between which there are no longitudinal ribs has at both of its ribs the grooves and notches shown in FIGS. 3–5 for one of the ribs. These grooves and notches serve to position elements which releasably fix the optical elements in position in the holders, as described below.

FIGS. 3–5 further illustrate how the holders 2a, 3a and 4a are respectively provided with inner peripheral surfaces 224, 324, 424 extending along the entire length of the holders and engaging the peripheries of the optical elements so as to position the latter transversely with repsect to the optical axis. In addition, the holders have at one of their ends inwardly directed flanges 225, 325 and 425 which also extend substantially along the entire length of the holders and which respectively engage one of the faces of the optical elements so as to determine the axial position thereof along the optical axis. Finally, these holders are provided at their lower portions and at their other ends with flanges 226, 326 and 426 which are of an extremely short length and which engage the other faces of the optical elements.

The structure for releasably fixing the optical elements in position is shown in the example of FIGS. 6 and 7 for the aspherical lens 2 which is mounted in the holder 2a. As is clearly apparent from FIGS. 6 and 7, the periphery 2' of the lens 2 engages the inner periphery 224 of the holder 2a, while the face 2" of the lens engages the inwardly directed flange 225 which extends substantially along the entire length of the holder. On the other hand, the opposed face 2''' of the lens 2 engages the relatively short flange 226.

The notches 223 of the pair of adjoining ribs 8b which define the opening 2b receive a force-transmitting element 227 which directly engages the lens 2 at an upper portion thereof with a surface 228 of the element 227 which conforms to the configuration of the lens 2 at the part thereof engaged by the element 227. This force-transmitting element 227 serves to transmit the force of an elongated leaf spring 229 which extends along and together with element 227 substantially closes the opening 2b. This leaf spring 229 has laterally extending angularly shaped lugs 230 which are situated in the grooves 222 and engage the transverse ribs 8b so that these ribs act as a support for the springy element 229 which presses downwardly on the force-transmitting element 227 so that through the latter and the spring 229 the lens 2 is releasably held in position in the holder 2a.

The introduction of the lens into or removal thereof from the holder takes place by moving the lens in opposition to the leaf spring toward the ribs of the cover and then shifting the lens along the optical axis over the short flange 226.

The structures for releasably holding the other optical elements in the other holders is substantially the same as that of FIGS. 6 and 7, the primary difference being that the force-transmitting element 227 is provided with a surface 228 which conforms to the particular configuration of the element which it engages.

FIG. 8 shows another embodiment of the invention in a sectional view taken in a plane transverse to the optical axis illustrated by the circle 32 which is normal to the plane of FIG. 8. This embodiment is also provided with a lamp-housing cover constructed in accordance with the present invention. Whereas in the embodiment of FIGS. 2-7 the cover 8 is turnable about a pin 11 which extends perpendicularly with respect to the optical axis, in the embodiment of FIG. 8 the lamp-housing cover 80 is turnable about an elongated hinge pin 31 which extends parallel to the optical axis 32 of the projector 33. This hinge pin 31 is carried by a support member 34 which is fixedly mounted on the floor 35 of the projector 33. In the solid-line position or closed position of the cover 80, it is releasably held by a lock member 36 which is turnably carried by an intermediate wall 37 of the projector.

Constructed integrally with the grid structure of the cover 80 are the several holders for the optical elements, precisely in the same way as described above in FIGS. 2-7. FIG. 8 illustrates only the single holder 38 for the lens-shaped optical element 39. The type of mounting for the cover 80 which is shown in FIG. 8 is selected particularly in the case where the optical elements, such as the hollow reflector and/or one of the condensor lenses is situated in very close proximity to the projection lamp 40 which is carried by a socket 41 fixed on the floor 35 of the projector. Tilting of the cover to an open position as shown in dotted lines in FIG. 8 is therefore possible with this construction in the case where the optical elements are located so close to the lamp that tilting in the manner shown in FIG. 2 would not be possible.

It will be seen that the unification of the holders for the optical elements with the apertured cover does not result in any substantial increase in the manufacturing cost of the cover while at the same time it saves the requirement of any special holders and gives the optical elements an exceedingly stable mounting as well as a guarantee of their accurate positioning with respect to each other and the objective.

Moreover, when the cover is tilted to its open position, all of the optical elements are easily accessible so that they can be dusted, for example. The lamp which remains in the lamp housing, and which normally would be difficult to have access to at its position confined between the hollow reflector and the condensor lens, is now also freely accessible and can be reached without any effort.

A further practical advantage achieved by the invention resides in the fact that the floor of the projector housing, which in any event must support various mechanical and electrical components of the projector, need not carry the holders for the optical elements, so that a far better load distribution is achieved with the invention. Furthermore, during the cooling of the device the stream of cooling air can reach the optical elements in a better manner than when slidable individual holders are used.

Moreover, any heat which is absorbed by the holders is transferred directly to the cover and not to the floor of the projector housing.

The invention is of particular advantage in the case where a single basic device is to be constructed in different optical forms. Then, for each optically different type of device only one corresponding lamp-housing cover is required. Also, if there should be a subsequent change in the optical concept or principle of operation of the projector, then it is only necessary to change one type of lamp-housing cover for another at an extremely small cost.

What is claimed is:

1. For use in a photographic projector, an apertured lamp-housing cover, and a plurality of holders for optical elements of the projector, said holders being fixed to said cover and forming a structural unit therewith, said cover being formed in registry with said holders, respectively, with openings extending transversely with respect to the optical axis and situated at the side of said holders next to said cover so that said holders communicate through said cover with the outer atmosphere, a plurality of springy elements are respectively situated in said transverse openings of said cover in registry with said holders for yieldably maintaining optical elements therein. Said cover being formed by intersecting longitudinally and transversely extending ribs which define between themselves the apertures of said cover, so that said cover has the form of a grid, said transverse openings each being defined between a pair of adjoining transverse ribs between which there are not longitudinal ribs, and each pair of transverse ribs maintaining a springy element in position in the transverse opening defined therebetween, and a force-transmitting element engaging each springy element and adapted to transmit the force therefrom to an optical element in each holder, said force-transmitting element being adapted to directly engage the optical element.

2. The combination of claim 1 and wherein a pair of support members are provided one supporting said hinge means and the other supporting said cover at a part thereof distant from said hinge means, a lamp socket, and support means common to and carrying said pair of support members and said lamp socket.

3. The combination of claim 1 and wherein an objective is provided for the projector, that one of said support members which supports said hinge means also carrying said objective.

References Cited

UNITED STATES PATENTS

| 2,705,437 | 4/1955 | Lessman | 88—28 |
| 3,035,485 | 5/1962 | Walter | 88—28 |
| 3,126,785 | 3/1964 | Zillmer | 88—24 |

FOREIGN PATENTS

| 1,124,257 | 2/1962 | Germany. |

NORTON ANSHER, Primary Examiner.

RICHARD M. SHEER, Assistant Examiner.

U.S. Cl. X.R.

353—87, 119